(12) United States Patent
Andrew

(10) Patent No.: US 12,736,485 B2
(45) Date of Patent: Sep. 15, 2026

(54) MULTI-FRACTION SAMPLE HOLDER FOR 3D PARTICLE ANALYSIS

(71) Applicant: Carl Zeiss X-ray Microscopy, Inc., Dublin, CA (US)

(72) Inventor: Matthew Andrew, Livermore, CA (US)

(73) Assignee: Carl Zeiss X-ray Microscopy, Inc., Dublin, CA (US)

( * ) Notice: Subject to any disclaimer, the term of this patent is extended or adjusted under 35 U.S.C. 154(b) by 183 days.

(21) Appl. No.: 18/048,187

(22) Filed: Oct. 20, 2022

(65) Prior Publication Data

US 2023/0146198 A1 May 11, 2023

Related U.S. Application Data

(60) Provisional application No. 63/263,625, filed on Nov. 5, 2021.

(51) Int. Cl.

| | |
|---|---|
| ***G01N 23/083*** | (2018.01) |
| ***B01L 3/00*** | (2006.01) |
| ***G01N 23/04*** | (2018.01) |

(52) U.S. Cl.
CPC ........ *G01N 23/083* (2013.01); *B01L 3/50853* (2013.01); *G01N 23/04* (2013.01); *G01N 2223/307* (2013.01); *G01N 2223/309* (2013.01); *G01N 2223/321* (2013.01)

(58) Field of Classification Search
CPC ................ G01N 23/083; G01N 23/04; G01N 2223/309; G01N 2223/321; G01N 23/046; G01N 2223/307; B01L 3/50853
See application file for complete search history.

(56) References Cited

U.S. PATENT DOCUMENTS

| | | | | |
|---|---|---|---|---|
| 6,677,162 | B1 * | 1/2004 | Wendelbo et al. | B01J 9/0046 422/534 |
| 2014/0072095 | A1 * | 3/2014 | Feser | G01N 23/223 378/4 |
| 2020/0182808 | A1 | 6/2020 | Zhou et al. | |
| 2021/0302281 | A1 | 9/2021 | Groenewoud | |

FOREIGN PATENT DOCUMENTS

| | | | | | |
|---|---|---|---|---|---|
| CN | 106950231 | B | | 7/2017 | |
| CN | 108051461 | A | | 5/2018 | |
| CN | 108645760 | A | | 10/2018 | |
| CN | 209117609 | U | * | 7/2019 | G01N 23/046 |
| CN | 113295720 | A | | 8/2021 | |
| EP | 3035049 | A1 | | 9/2020 | |

OTHER PUBLICATIONS

European Search Report, completed on Feb. 27, 2023, from European Application No. EP 22202578.5, filed on Oct. 25, 2022. 8 pages.

(Continued)

*Primary Examiner* — Carolyn Fin
(74) *Attorney, Agent, or Firm* — HoustonHogle LLP

(57) ABSTRACT

An x-ray minerology analysis system includes a sample assembly for an x-ray microscopy system. It comprises an outer tube and a bottom plug sealing an inner bore of the outer tube, wherein the outer tube contains powder to be analysed by the x-ray microscopy system.

17 Claims, 2 Drawing Sheets

(56) References Cited

OTHER PUBLICATIONS

Wang et al., "3D image segmentation for analysis of multisize particles in a packed particle bed", Powder Technology, ScienceDirect, vol. 301, Nov. 2016, pp. 160-168, 9 Pages.
Puvvada et al., "High speed X-ray computed tomography for plant-site analysis of pebble phosphate", Minerals Engineering, vol. 130, Jan. 2019, pp. 129-141, 13 Pages.
European Examination Report, issued on Apr. 9, 2025, from European Application No. EP 22202578.5, filed on Oct. 19, 2022. 7 pages.

* cited by examiner

MULTI-FRACTION SAMPLE HOLDER FOR 3D PARTICLE ANALYSIS

RELATED APPLICATIONS

This application claims the benefit under 35 USC 119(e) of U.S. Provisional Application No. 63/263,625, filed on Nov. 5, 2021, which is incorporated herein by reference in its entirety.

BACKGROUND OF THE INVENTION

Various imaging modalities have been used to identify and visualize mineral content of rocks, both in two dimensions (2D) and in three dimensions (3D). For example, these imaging modalities can analyze rock samples and determine comminution statistics for the mining industry. In more detail, in mining and material processing in general, the particle size of materials is reduced often by crushing, grinding, cutting, vibrating, and/or other processes. This is an important operation in mineral processing, ceramics, electronics, and other fields.

In typical operation, these imaging modalities create image datasets such as 3D volumes or 2D images. Image analysis techniques are then employed to assess particle sizes and size distributions and mineral content of the particles from the volumes and the images.

X-ray computed tomography (CT) microscopy systems are a common imaging modality. These systems irradiate the samples with x-rays, typically in a range between 1 and several hundred keV. 2D projection images are collected at multiple angles and 3D volumes of the sample are reconstructed from these projections.

SUMMARY OF THE INVENTION

It can often be important to analyze many samples in an automated fashion. Multiple size fractions need to be analyzed per sample and multiple samples per system in order to get a statistically representative description of particle behavior. Automated sample loaders can help alleviate this problem to some degree by automatically mounting a sequence of samples onto the sample stage, but are limited in terms of the maximum number of samples that they can mount.

In general, according to one aspect, the invention features a sample assembly for an x-ray microscopy system, comprising an outer tube and a bottom plug sealing an inner bore of the outer tube, wherein the outer tube contains powder to be analyzed by the x-ray microscopy system.

In embodiments, spacers are inserted into the outer tube for separating multiple samples in the outer tube. As a consequence, the outer tube may hold three or more samples. A top plug is useful for sealing a top of the outer tube.

In use, the outer tube holds different samples with different particle sizes along a length of the tube, such as from a mining operation.

In terms of construction, the outer tube can is constructed from plastic and can be less than 5 millimeters in diameter with an inner bore of the outer tube is less than 3 millimeters in diameter.

In general, according to another aspect, the invention features an x-ray microscopy system, comprising a source of generating x-rays, a sample holder for holding samples in the beam, a sample assembly held by the sample holder, including an outer tube that contains powder samples, and a detector for detecting the beam after interaction with the samples.

A positioning stage can be useful for moving the sample holder in a y-axis direction and the sample assembly holds different samples distributed along the y-axis.

In general, according to another aspect, the invention features a method of operation of an x-ray microscopy system. The method comprises generating x-rays, holding samples in the beam with a sample assembly including an outer tube containing powder samples, and detecting the beam after interaction with the samples.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
FIG. 1 is a side cross-sectional view of sample assembly include a mounting tube containing five samples, according to the present invention, for use in the x-ray CT system.
Figure 1:
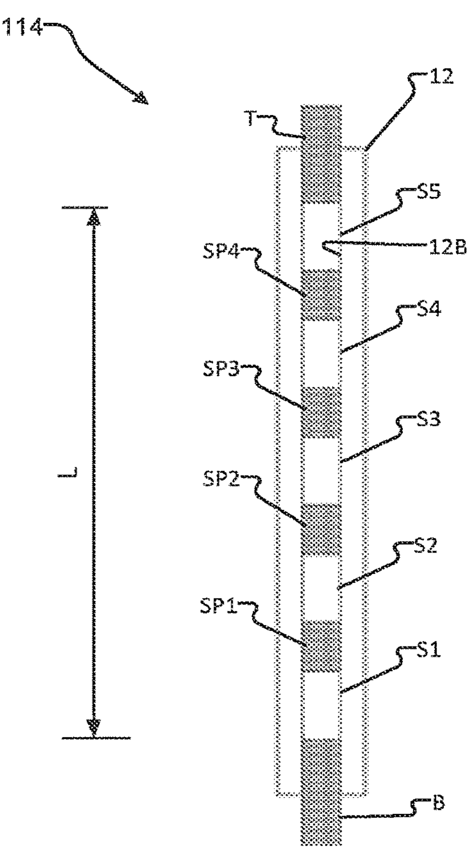

FIG. 1 shows a sample assembly 114 that has been constructed according to the principles of the present invention. This concerns an inexpensive and easy technique that allows for multiple size fractions of powder to be mounted in a single sample holder and thereby analyzed in an automated sequential way without having to remount the sample.

In general, the sample assembly 114 comprises an elongate outer mounting tube 12. This outer tube 12 is hollow with a preferably circular cross-section and a circular cross-section inner bore. It is preferably constructed from a low-Z material such as polyimide, Polytetrafluoroethylene (PTFE) or Polyether ether ketone (PEEK) tubing or other plastic. An outer diameter of the outer mounting tube 12 can be a few millimeters in diameter such as less than 5 millimeters (mm), or preferably around 2 mm. The inner diameter of its inner bore can be less than 3 mm in diameter and is preferably about 1 mm.

Multiple samples S1, S2, S3, S4, S5, possibly with different size fractions or even multiple individual samples, are usually mounted in the hollow inner bore 12B of the outer mounting tube 12. The samples are spaced from each other along the axis of the mounting tube 12 by short lengths of solid cylindrical spacers SP1, SP2, SP3, SP4 that seal against the inner bore to separate the discrete samples. The bottom end of the mounting tube is sealed with a bottom plug B and the top of the mounting tube 12 is sealed by a top plug T. Typically, the spacers SP1, SP2, SP3, SP4, bottom plug B, and top plug T are all composed of a low Z material such as graphite so as to not significantly interfere with the x-ray imaging process.

In the example shown above, samples S1, S2, S3, S4, S5 are preferably arranged in size order, arranged from the coarser near the base such as samples S1 and S2 to the finest samples S4, S4 near the top. This allows for easy fraction indexing of each sample during tomography setup.

During setup, in a preferred embodiment, the graphite rod sections are used and spacers SP1, SP2, SP3, SP4 are inserted into the mounting tube 12 sequentially, clearing the mounting tube of any residual powder adhering to the tube's inner bore wall, minimizing cross contamination of size fraction samples. The same graphite rod sections are also used as the top plug T and the bottom plug B to allow mounting into a pin-vice sample holder 112 and closure of the top.

It should be noted that the total length L of the sample being mounted in a single outer tube 12 should be less than this maximum vertical (y-axis) travel of the rotation and positioning stage 110 of the x-ray imaging system. Thus, L will often be less than 5 centimeters.

The bottom graphite plug B is first bonded inside the inner bore of the outer mounting tube 12. Often this is a 1-2 centimeter length of graphite that is inserted inside the plastic outer tube 12, then is sealed/attached to the base of the plastic outer tube 12 with epoxy such as a UV curing epoxy. Preferably, about half the length of the graphic bottom plug extends beyond the end of the outer tube to interface with the sample holder 112.

Then, the first sample S1 is introduced into the inner bore of the outer tube and packed against the top end of the bottom plug B.

Then the spacer SP1 is placed in the outer tube 12 over the first sample S1. Often this is a small length of graphite, 1-2 millimeters in length.

This process is repeated adding the samples S2-S5 with the intervening spacers SP2-SP4. Finally, the top plug T is sealed in place.

Figure 2:
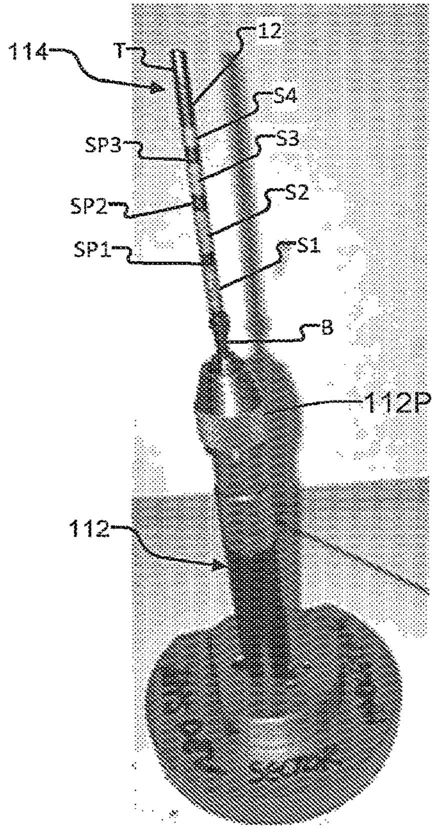
FIG. 2 is a perspective view of the samples, mounting tube, and sample holder.

FIG. 2 shows a sample assembly 114 containing four samples S1-S4. It is held in the sample holder 112. Specifically, a pin vise 112P of the sample holder clamps onto the length of the bottom plug B that extends from the outer mounting tube 12.

Figure 3:
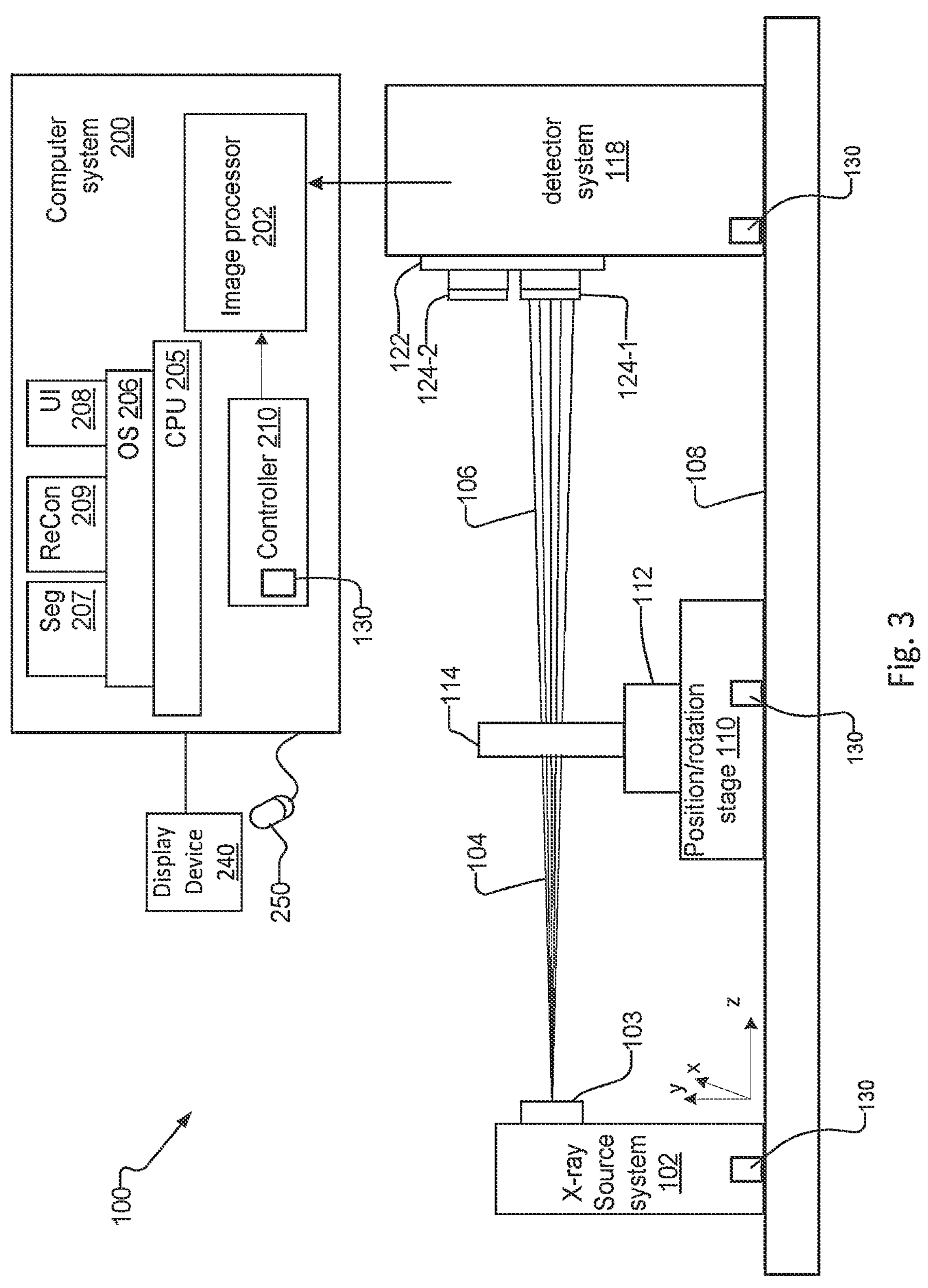
FIG. 3 is a schematic diagram of an x-ray CT system with the mounting tube.

FIG. 3 is a schematic diagram of an x-ray CT system 100 for analyzing the sample in the sample assembly 114.

In general, the x-ray CT system 100 includes an x-ray source system 102 that generates an often polychromatic x-ray beam 104 and a rotation and positioning stage 110 with sample holder 112 for holding the sample assembly 114 in the x-ray beam 104. Images or x-ray projections are captured by a detector system 118. The x-ray source system 102, the rotation and positioning stage 110, and the detector system are mounted to a base 108 of the x-ray CT system 100.

A computer system 200 typically receives and processes these images or projections and provides general control of the system 100. The computer system 200 possibly along with a special purpose graphics processor will typically perform tomographic reconstruction using the x-ray projections of the samples in the sample assembly 114.

The x-ray source 102, in one example, is a polychromatic x-ray source. Laboratory x-ray sources are often used because of their ubiquity and relatively low cost. Nonetheless, synchrotron sources or accelerator-based sources are other alternatives.

Common laboratory x-ray sources include an x-ray tube, in which electrons are accelerated in a vacuum by an electric field and shot into a target piece of metal, with x-rays being emitted as the electrons decelerate in the metal. Typically, such sources produce a continuous spectrum of background x-rays (i.e. bremsstrahlung radiation) combined with sharp peaks in intensity at certain energies that derive from the characteristic lines of the target, depending on the type of metal target used.

In one example, the x-ray source 102 is a rotating anode type or micro focused source, with a Tungsten target. Targets that include Molybdenum, Gold, Platinum, Silver or Copper also can be employed. A transmissive configuration of the x-ray source 102 can be used in which the electron beam strikes the thin target 103 from its backside. The x-rays emitted from the other side of the target 103 are then used as the beam 104. Reflection targets are another option.

The x-ray beam 104 generated by source 102 has an energy spectrum that is controlled typically by the operating parameters of the source. In the case of a laboratory source, important parameters include the material of the target and the acceleration voltage (kVp). The energy spectrum is also dictated by any conditioning filters that suppress unwanted energies or wavelengths of radiation. For example, undesired wavelengths present in the beam can be eliminated or attenuated using, for instance, an energy filter (designed to select a desired x-ray wavelength range/bandwidth).

When the sample assembly 114 is exposed to the x-ray beam 104, the x-ray photons transmitted through the sample form an attenuated x-ray beam 106 that is received by the spatially resolved detector system 118 in a projection configuration. In some other examples, an objective lens such as a zone plate lens is used to form an image onto the detector system 118 of the x-ray imaging system 100. In alternative embodiments the detector system is a flat panel detector.

In the most common configuration of the detector system 118, a magnified projection image of the sample 114 is formed on the detector system 118 with a geometrical magnification that is equal to the inverse ratio of the source-to-sample distance and the source-to-detector distance. Generally, the geometrical magnification provided by the x-ray stage is between 2× and 100×, or more. In this case, the resolution of the x-ray image is limited by the focus spot size or virtual size of the x-ray source system 102.

To achieve high resolution, an embodiment of the x-ray CT system 100 further utilizes a very high resolution detector 124-1 of the detector system 118 in conjunction with positioning the sample 114 close to the x-ray source system 102. In one implementation of the high-resolution detector 124-1, a scintillator is used in conjunction with a microscope objective to provide additional magnification in a range between 2× and 100×, or more.

Other possible detectors can be included as part of the detector system 118 in the illustrated x-ray CT system 100. For example, the detector system 118 can include a lower resolution detector 124-2. This could be a flat panel detector or a detector with a lower magnification microscope objective, in examples. Configurations of one, two, or even more detectors 124 of the detector system 118 are possible.

Preferably, two or more detectors 124-1, 124-2 are mounted on a turret 122 of the detector system 118, so that they can be alternately rotated into the path of the attenuated beam 106 from the sample 114.

When multiple samples need to be handled in an automated fashion, an automation application 207 is employed. Based on operator defined parameters, the automation application running on the CPU 205 controls the sample handling via the controller 210. It instructs the positioning and rotation stage 110 via its control interface 130 to move the sample assembly 114 in and out of the beam path during x-ray source system 102 calibration and sample analysis and also how the sample is positioned in the beam along the x, y, and z axes.

Once positioned, the automation application 207 via the controller 210 instructs the positioning and rotation stage 110 to move the sample assembly 114 in the y-axis direction to bring one of the samples S1-S5 into the beam. The automation application then instructs the positioning and rotation stage 110 to rotate the sample assembly 114 relative to the beam 104 to perform the CT scan of one of the samples, such as sample S1. Then, once processed, the automation application 207 instructs the positioning and rotation stage 110 to move the sample assembly 114 in the y-axis direction to bring the next of the samples S1-S5 into the beam such as sample S2. The automation application then instructs the positioning and rotation stage 110 to rotate the sample assembly 114 relative to the beam 104 to perform the CT scan of sample S2.

This process is repeated until all of the samples S1, S2, S3, S4, and S5 contained in the outer tube 12 have been scanned.

Once scanned, the automation application 207 via the controller 210 further controls a sample loader that removes the sample assembly 114 from the sample holder 112 and inserts a new sample assembly.

Performing particle analysis using 3D x-ray microscopy automation is a significant challenge. Multiple size fractions need to be analyzed per sample and multiple samples per system in order to get a statistically representative description of particle behavior. The use of the automated sample loader can help alleviate this problem by automatically mounting a sequence of samples onto the sample stage. The use of the sample assembly allows for multiple samples to be loaded together.

In one example, the computer system 200 includes an image processor 202 that analyzes the x-ray projections and possibly performs the calculations necessary for tomographic reconstructions created from the x-ray projections. A display device 240, connected to the computer system 200, displays information from the x-ray CT system 100. An input device 250 such as a touch screen, keyboard, and/or computer mouse enables interaction between the operator, the computer system 200, and the display device 240.

A user interface application 208 executes on an operation system 206 that controls access to a central processing unit CPU 205 of the computer system 200. In one example, the operator defines/selects CT scan or calibration parameters via the user interface 208. These include x-ray acceleration voltage settings, and settings for defining the x-ray energy spectrum of the scan and exposure time on the x-ray source system 102. The operator also typically selects other settings such as the number of x-ray projection images to create for each sample S1-S5 in the sample holder 114, and the angles to rotate the rotation stage 110 for rotating the sample holder 114 for an x-ray CT scan in the x-ray beam 104, along with the positioning of the sample in the beam along the x, y, and z axes.

The computer system 200, with the assistance of its image processor 202, accepts the image or projection information from the detector system 118 associated with each rotation angle for each of the samples S1-S5. The image processor 220 creates a separate projection image for each rotation angle for each of the samples S1-S5, and combines the projection images using CT reconstruction algorithms 209 to create 3D tomographic reconstructed volume information for each of the samples S1-S5.

While this invention has been particularly shown and described with references to preferred embodiments thereof, it will be understood by those skilled in the art that various changes in form and details may be made therein without departing from the scope of the invention encompassed by the appended claims.

What is claimed is:

1. A sample assembly for an x-ray microscopy system, comprising:

an outer tube;

a bottom plug sealing an inner bore of the outer tube, wherein the outer tube contains powder to be analyzed by the x-ray microscopy system; and spacers inserted into the outer tube for separating multiple samples in the outer tube, wherein the spacers are discrete from each other and not connected to each other such that they can be separately inserted into the outer tube.

2. The sample assembly of claim 1, wherein the outer tube holds three or more samples.

3. The sample assembly of claim 1, further comprising a top plug for sealing a top of the outer tube.

4. The sample assembly of claim 1, wherein the outer tube holds different samples with different particle sizes along a length of the tube.

5. The sample assembly of claim 1, wherein the outer tube holds different samples from a mining operation along a length of the tube.

6. The sample assembly of claim 1, wherein the outer tube is constructed from plastic.

7. The sample assembly of claim 1, wherein the inner bore of the outer tube is less than 5 millimeters in diameter.

8. The sample assembly of claim 1, wherein the inner bore of the outer tube is less than 3 millimeters in diameter.

9. The sample assembly of claim 1, wherein the spacers are discrete from each other and sequentially inserted into the outer tube.

10. An x-ray microscopy system, comprising:

a source of generating x-rays;

a sample holder for holding samples in the beam;

a sample assembly held by the sample holder, including an outer tube that contains powder samples and spacers inserted into the outer tube for separating multiple samples in the outer tube, wherein the outer tube comprises a bottom plug sealing an inner bore of the outer tube, and a portion of the bottom plug extends beyond an end of the outer tube to engage with the sample holder;

wherein the spacers are discrete from each other and not connected to each other such that they can be separately inserted into the outer tube; and a detector for detecting the beam after interaction with the samples.

11. The system of claim 10, wherein the sample assembly further includes a bottom plug sealing an inner bore of the outer tube.

12. The system of claim 10, further comprising a top plug for sealing a top of the outer tube.

13. The system of claim 10, wherein the outer tube holds different samples with different particle sizes along a length of the tube.

14. The system of claim 10, further comprising a positioning stage for moving the sample holder in a y-axis direction and the sample assembly holds different samples distributed along the y-axis.

15. The x-ray microscopy system of claim 10, wherein the sample holder comprises a pin vise for clamping onto the portion of the bottom plug that extends beyond the end of the outer tube.

16. A method of operation of an x-ray microscopy system, the method comprising:

introducing a first powder sample into an inner bore of an outer tube of a sample assembly of the x-ray microscopy system by packing the first powder sample against a top end of a bottom plug that seals a bottom end of the outer tube;

placing a first spacer in the outer tube over the first powder sample;

introducing a second powder sample into the inner bore over the first spacer;

repeating placement of spacers and introduction of powder samples over the spacers to load multiple powder samples separated from each other by the spacers in the inner bore of the outer tube, wherein the spacers are discrete from each other and not connected to each other such that they can be separately inserted into the outer tube;

generating x-rays;

holding samples in the beam with the sample assembly; and detecting the beam after interaction with the samples.

17. The method of claim 16, further comprising moving the sample assembly in a y-axis direction to move different samples into the beam.

* * * * *